UNITED STATES PATENT OFFICE

2,366,516

METHOD FOR PRODUCING LAYERS ON SOLID OBJECTS

Walter Geffcken and Edwin Berger, Jena, Germany; vested in the Alien Property Custodian No Drawing. Application May 3, 1940, Serial No. 333,186. In Germany May 27, 1939

2 Claims. (Cl. 117—124)

The reflection occasioned on the outer surface of a transparent object when light rays pass through that object can be diminished in a known manner by applying to the object a thin layer of a substance whose refractive index is lower than that of the material of which the object is constituted. By a suitable choice of the refractive index of this substance and of the thickness of the layer provided, it is even possible to wholly eliminate reflection. It is furthermore known that surface reflection can be diminished by the application of several thin layers of appropriate substances, although in this case it is not necessary that all of such layers have a lower refractive index than the material of the object. However, these previously known methods for producing layers of the character indicated have not been entirely satisfactory because such layers offered little resistance to chemical or mechanical attacks.

We have found that layers of the nature indicated which will not only be highly effective in the elimination of surface reflection on objects but which will offer strong resistance to chemical and mechanical attacks, can be obtained if for their production, a low-hydrated, gel-like, hydrated oxide of an element capable of forming colloidal hydrated oxides difficultly soluble in water is precipitated on the object. The hydrated oxide may be used either alone or with other materials or mixed with one or more other hydrated oxides. The layers can be applied to the object in a number of ways, for instance, by precipitating the hydrated oxide from vapors, or by applying it mechanically as by the atomizing of compounds of the hydrated oxides or by dipping the object into compounds of the same.

The production of hydrated oxides suitable for the purposes of the invention can be effected in a known manner by the chemical decomposition of salts. With salts containing the desired elements in the acid radical the decomposition can be accomplished by reacting them with substances yielding H-ions. For example, one may precipitate sodium silicate solutions with the aid of muriatic acid and thus obtain the hydrated oxide of silica. In the case of compounds containing the elements as basic components, one may decompose the halides or other suitable compounds of such elements (as ester, for instance) by the action of water or of other substances capable of yielding hydroxyl ions.

When the hydrated oxides thus obtained are colloidally dispersed in water or in suitable organic liquids, the objects to be treated can be coated with a uniform layer, or with several such layers, by dipping them in such colloidal mixture or by pouring or spraying the mixture onto them and then drying the applied mixture, the hydrated oxide forming a gel-like layer on the object as the dispersion liquid evaporates. By careful heating of this gel-like material, the dispersion liquid still held by it and the water of hydration are removed so that the gel-like material is caused to shrink in a manner numerically determinable by preliminary tests, until it forms a very thin layer of good durability both in a mechanical and chemical respect. At the same time the refractive index of the material changes so that its final effective refractive index must be determined before the more exact production of reflection diminishing layers can be proceeded with.

The final stage of the hardening of the gel-like material is usually reached when heated to a temperature of not exceeding 250° C., at which stage the layer or layers of low-hydrated, hydrated oxide of the element utilized will have been arrived at. This hardening action can also be effected while the layers are being produced by first heating the objects and then applying the colloidal mixtures of the hydrated oxide or oxides to the objects by atomization.

What very likely is the simplest method of producing uniform layers is to expose the object to a fog including the material to be applied. Fogs of this kind and of particularly fine dispersal are obtained if a vapor stream of a compound decomposable by water is mixed with steam, say, by spraying a halide of the element used with the aid of a nozzle upon the object while the latter is suspended in the air.

When the hydrated oxide used is capable of producing a layer having a rather low refractive index, for example, a water containing layer of silica oxide, the application of a single layer of such material on the object is in many instances sufficient to accomplish an adequate diminution of the surface reflection. Layers of a particularly pronounced resisting capacity and of a refractive index which can be as low as about 1.4 and still go beyond 2.0, are obtainable with the use of the hydrated oxides of aluminum, iron, nickel, chromium, tungsten, molybdenum, cerium or with the use of the hydrated oxides of elements of the fourth group of the periodic system excepting carbon, provisions being made that each of the finally produced layers consist of at least one-half of the hydrated oxide or oxides utilized. To produce highly refractive layers it is preferable to use the hydrated oxides of titanium, zirconium, tin or lead, while for the production of low refractive layers the hydrated oxides of aluminum or silicon are preferred. While the hydrated oxides of lanthanum, tantalum and thorium are also well suited for the production of highly refractive layers, they have the disadvantage of being relatively expensive. By way of example, it might be mentioned that the refractive index of a low-hydrated layer of silicon hydrated oxide is about 1.45 and that of a low-hydrated layer of titanium hydrated oxide is about 2.10.

While the essential purpose of the invention is to reduce surface reflection, materials of the nature indicated can be applied to the object as very dense and chemically resistant layers for the purpose of completely protecting the object from corrosion. This may be of importance not only for objects made of chemically sensitive glasses, but also for objects which may be made of metal or organic substances capable of swelling, etc. Thus, the blackening of silvered mirrors can be prevented and in the event aluminum is used as the element in the material, the reflecting quality of the mirror will not only be maintained at its initial value, but even increased beyond that value. The invention may also be used to advantage in the retouching of optical surfaces. In this connection, the refractive index of the layer chosen should be equal to that of the glass to which it is applied, so that the retouching will be practically invisible. A proper choice of such materials may make it useful also for the formation on the glass surface of secret characters which can be discernible only under special conditions, say by the interferometric observation of differences in thickness. Furthermore, layers of the character indicated may be used also for their susceptibleness to liquids, or the altered surface (catalytic) effect of their electrical properties, etc.

It is known that, for decorative purposes, layers causing interference colors (so called iridescent lustre colors) can be produced on objects of glass by exposing the latter to metallic-salt vapors or by spraying them with solutions of metallic salts after having previously heated said objects to fusing temperature. The method suggested according to the present invention differs from these known methods in that it is carried through at a temperature lying at least 50° C. below the fusing temperature of the object being treated. Actually, the method is usually carried through without resorting to temperatures higher than 250° C. The advantage of this is that the application of the coating materials of the instant invention to optical glasses does not harm their surfaces whereas the application of prior coatings to such objects would render their surfaces suitable for optical purposes.

In practicing the present invention care must be taken to prevent the production of layers having a pronounced diffusing power (surfaces of a smoky to milky appearance). This effect may appear to a marked extent when spraying a fog of the colloidal mixture (particularly in the case of titanium and silicic acid) as well as during the decomposition in damp air of those halides which react strongly when in contact with aqueous vapor, such as, titanium tetrachloride (TiCl₄) and aluminum trichloride (AlCl₃). While this effect may be avoided by a careful control of the humidity of the air and by a substantial rarification of the gas stream, much more simple and reliable methods are available. For example, in the case of TiCl₄, the addition of a reactive halide carrier, such as silicon tetrachloride (SiCl₄) to the TiCl₄ vapor, will eliminate the possibility of this effect. Gaseous muriatic acid accomplishes similar results. The advantage of SiCl₄, however, is that it can be mixed in the liquid state with TiCl₄ in any desired proportion. Another effective method is to reduce the excessive volatileness of the halides or their mixtures by dissolving them in an indifferent solvent such as organic neutral halides and, more particularly, carbon tetrachloride (CCl₄). A suitable mixture, for instance, would consists of 3 parts by volume of TiCl₄, 1 part by volume of SiCl₄ and 10 parts by volume of CCl₄. By spraying this mixture through a nozzle, at room temperature, onto a plate heated above 100° C., there will be formed on the plate an entirely clear gel-like layer which will have a refractive index so high as to practically preclude the presence of any Si, thus presenting a pure gel-like layer of TiO₂. With AlCl₃ the same results can be accomplished by following the procedure outlined with respect to TiCl₄.

A further difficulty resides in the fact that certain halides, such as, silicon tetrachloride (SiCl₄) and silicon tetrabromide (SiBr₄), at low temperatures (below 400° C.) react only slowly in the desired manner with gaseous water but quickly with liquid water. Consequently it is difficult to produce a layer of these materials on a plate if the latter is heated above 100° C. but not more than 400° C. At room temperature, however, fine fogs of muriatic acid can be formed whose particles appear to act as nuclei of condensation for the segregation of liquid water for when the silicon tetrachloride is applied in this fog there is produced onto the plate a clear, silicon, gel-like layer. The condensation, however, being in the form of minute droplets, makes it necessary that the plate be perfectly clean and that the coating be applied uniformly otherwise a stained and irregular coating will result. The uniformity of the coating can be considerably improved by the admixture of phosphorous oxychloride which seems to have a condensating effect. A mixture of heated SiCl₄ vapor and super-heated aqueous vapor has also proved advantageous. All of these substances, however, cannot be used to advantage because the greater part of the halides escape in the form of vapor which moreover are injurious to health. Nor is it possible in this way to obtain the coating on a plate whose temperature exceeds 100° C., a desirable condition if TiO₂ and SiO₂ is to be applied in one operation and the mixture of both substances possibly to be arrived at. A far better solution of this problem consists in using instead of air, a stream of combustible gases and in igniting such gas as it leaves the nozzle. This considerably accelerates the reaction, resulting in thick white clouds of smoke being given off. As the gas used must not produce any soot, hydrogen, for instance, would be recommendable, though the use of this gas may lead to the reappearance of the aforementioned defect, viz., the formation of a cloudy film. A clear coating can be obtained, however, by the introduction of an indifferent gas, such as, nitrogen, which enables the flame temperature to be reduced to 800° C. The introduction of the nitrogen will be expedited by introducing small quantities of oxygen which will maintain the flame temperature relatively uniform and prevent its extinction even if it is lowered by a further 100° C. In this manner it is possible to produce layers of hydrated SiO₂ on plates heated above 100° C., i. e., to maintain the same conditions applying in the case of TiO₂. This furthermore makes it possible to avoid use of the halides which are so inconvenient to handle and to utilize organic compounds as volatiles since the organic portion of the latter will be entirely consumed at the flame temperatures mentioned. Alkyl esters, such as, the methyl and ethyl esters of silicon, or acetyl acetonates such as aluminum acetyl acetonate, are also well united for this purpose.

The method above described is of special advantage, in that, it enables the production of layers whose refractive index as a whole lies between the refractive indices of two substances. This can be accomplished by the alternative application of very thin layers consisting of two substances of different refractive indices. Thus, if the object to be treated is placed upon a rotating disc and consecutively subjected to sprays of silicon dioxide hydrate and titanium dioxide hydrate, a plurality of infinitely thin alternate layers of these two materials will result. It has been found, that after the object has been treated in this manner for 200 revolutions, the total thickness of the layers amounts to only about $1\mu$, so that the thickness of a single layer is in the neighborhood of 5A, the magnitude of a molecule layer. It is believed that what has been so produced are not actually coherent layers of the mentioned thickness, but that several molecule layers of each substance were deposited at some portions and none at all in other portions, so that the resulting structure is in the nature of an actual mixture of these substances. Yet even if the structure were assumed to represent a sharply defined stratification, the effect of such a sequence, optically, would be similar to that of a mixture. It can be approximately computed by the rule of mixtures as that of a mean refractive index $n$ resulting from the equation $$n=\frac{P}{100}n_1+\frac{100-P}{100}n_2$$

where $p$ is the percentage in the total layers of the substance having a refractive index of $n$, and where $n_2$ is the refractive index of the other substance. In this manner it is also possible to produce layers which as a whole have the same refractive index as the object to be coated so that the layer structure will not be ascertainable by optical means.

The following examples are given to demonstrate the diminution in reflection achievable by the present invention.

By applying to a glass plate, having a refractive index of 1.89, a layer of $SiO_2$ hydrate, it will be possible by a suitable choice of the thickness of this layer, to obtain a reflection value of 0.3% for a prescribed wave length, such as, 485 $m\mu$ (green) for instance, whereas in the uncoated state of the glass plate the reflection value for such wave length would probably be 10%. For the remaining wave lengths such coating will produce reflection values which will be somewhat higher, amounting to 1% for instance in the case of 560 $m\mu$ (yellow). With a glass plate having a refractive index of 1.50, the reflection, by the same treatment, can be diminished to 2.9% at the best. However, if on a glass plate having a refractive index of 1.50, a layer of titanium dioxide hydrate having a refractive index of 2.52 is applied and on top of this a layer of silicon dioxide hydrate having a refractive index of 1.45 is applied, then the mean refractive index of the two layers will be such that it will be possible to make the reflection for a prescribed wave length vanish entirely. Thus if $\lambda$ is the wave length of light for which the reflection is to vanish, the thickness of the layer of titanium dioxide hydrate must be $0.0516\lambda$ and the thickness of the layer of silicon dioxide hydrate $0.23172\lambda$. Hence for $\lambda=560$ $m\mu$ (yellow) the first named layer must have a thickness of 30.9 $m\mu$ and the last named layer one of 129.7 $m\mu$. The layer thickness can be ascertained in a known manner by observation of the interference colors caused by the layers.

The production of a clear layer of zirconium oxide hydrate can be produced in the following manner. With the aid of one of the known spraying pistols and high air pressure produce a very fine fog of a 1% solution of zirconium hydrated oxide (correlated with zirconium oxide) and subject to such fog a glass plate which has been carefully cleaned and freed from grease and heated to 150° C. The compressed air used must also be free of oil. To insure that the fog covers the glass plate uniformly, it is desirable not to spray this solution alone but in a mixture consisting of 1 part of such solution, 1 part glycerine and 4 parts alcohol. The time of spraying is about one minute. This done, the plate is heated to about 300° C. in order to dehydrate further the hydrate oxide. The thickness of the layer is determined by the ensuing interference colors. It will be observed that when the water of hydration is removed the layer will have shrunk about 15%.

A very clear transparent layer of silicon dioxide hydrate can be produced by spraying on the object a stream of a mixture consisting of 20% by volume of hydrogen, 70% by volume of nitrogen and 10% by volume of nitrogen saturated with silicic acid methyl ester at a temperature of 20° C. The viscosity of the stream must be such that in one minute about 500 ccm. of the mixture flows through each square centimeter of the nozzle orifice of the spray gun, which corresponds to a velocity of 7 cm. per second. The distance between the nozzle and the object should be about 4 mm. The thickness of the applied layer can be readily ascertained by observing the interference color.

We claim:

1. The method of producing on an object a thin hardened layer of material capable of reducing surface reflection and strongly resistant to chemical and mechanical attacks, comprising applying to the object an aqueous dispersion of a gel-like low hydrated silicon dioxide, drying the dispersion to form a gel-like layer on the object and thereafter heating to a temperature of only 250° C. to convert the gel-like layer into a hardened reflection reducing surface consisting of a low-hydrated hydrated oxide of silicon.

2. The method of producing on an object a thin hardened layer of material capable of reducing surface reflection and strongly resistant to chemical and mechanical attacks, comprising applying to the object an aqueous colloidal dispersion of a gel-like low-hydrated oxide of an element selected from the group consisting of aluminum, iron, nickel, chromium, tungsten, molybdenum, cerium, lanthanum and tantalum and elements of the fourth group of the periodic system except carbon, drying the dispersion to form a gel-like layer on the object, and thereafter heating to a temperature of only 250° C. to convert the gel-like layer into a hardened reflection reducing surface, said surface consisting of a low-hydrated hydrated oxide of the element.

WALTER GEFFCKEN.
EDWIN BERGER.